(12) United States Patent
Haub et al.

(10) Patent No.: US 7,688,880 B2
(45) Date of Patent: Mar. 30, 2010

(54) METHOD AND APPARATUS FOR REDUCED NOISE AND CARRIER FEEDTHROUGH IN MULTIMODE TRANSMITTER

(75) Inventors: David Ryan Haub, San Diego, CA (US); Daniel Neil Ralston, San Diego, CA (US)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 925 days.

(21) Appl. No.: 11/421,200

(22) Filed: May 31, 2006

(65) Prior Publication Data

US 2007/0280338 A1    Dec. 6, 2007

(51) Int. Cl.
*H04B 1/00*    (2006.01)

(52) U.S. Cl. .................................. 375/148; 455/552.1

(58) Field of Classification Search .............. 455/127.4, 455/132, 552.1, 553.1; 375/144, 148
See application file for complete search history.

(56) References Cited

U.S. PATENT DOCUMENTS

| 5,584,059 | A * | 12/1996 | Turney et al. ............... 455/126 |
| 5,793,817 | A * | 8/1998 | Wilson ........................ 375/297 |
| 5,886,842 | A * | 3/1999 | Ziperovich ................... 360/51 |
| 6,208,621 | B1 * | 3/2001 | Ducaroir et al. ............. 370/241 |
| 6,745,015 | B2 | 6/2004 | Yochem et al. |
| 7,167,530 | B2 * | 1/2007 | Koomullil et al. ........... 375/329 |
| 7,167,722 | B2 * | 1/2007 | Chiu et al. ................ 455/553.1 |
| 2003/0119547 | A1 * | 6/2003 | Leyh et al. ................... 455/552 |
| 2006/0098765 | A1 * | 5/2006 | Thomas et al. .............. 375/346 |
| 2006/0182197 | A1 * | 8/2006 | Godambe et al. ........... 375/297 |
| 2007/0155335 | A1 * | 7/2007 | Love et al. .................... 455/69 |
| 2007/0218846 | A1 * | 9/2007 | Neill et al. .................. 455/90.1 |

OTHER PUBLICATIONS

Leung, Vincent, et al. Improved Digital-IF Transmitter Architecture for Highly Integrated W-CDMA Mobile Terminals, *IEEE Transactions on Vehicular Technology*, vol. 54, No. 1, Jan. 2005, pp. 1-13.
Gard, Kevin, et al. "Direct Conversion Dual-Band SiGe BiCMOS Transmitter and Receiver PLL IC for CDMA/WCDMA/AMPS/GPS Applications", *ISSCC* 2003, Feb. 11, 2003, pp. 1-8.
Zhou, Yijun, et al. "A Low Distortion Wide Band CMOS Direct Digital RF Amplitude Modulator", *ESSCIRC* 2002, pp. 1-4.

* cited by examiner

*Primary Examiner*—David C. Payne
*Assistant Examiner*—Leon-Viet Q Nguyen

(57) ABSTRACT

A high dynamic range low noise direct conversion transmitter within a multimode apparatus having multiple transmit and receive operating modes is described. The direct conversion transmitter can include a digital baseband coupled to a low noise direct conversion stage. A high dynamic range current folding digital to analog converter can be used to convert the digital baseband signals to analog representations. A wide dynamic range variable gain baseband amplifier couples the baseband signal to the direct conversion stage. A controllable passive attenuation stage operates to provide further gain control. Carrier feedthrough can be substantially eliminated using a carrier feedthrough cancellation loop that selectively utilizes one of a plurality of receivers configured for one of the multiple receive modes.

1 Claim, 7 Drawing Sheets

METHOD AND APPARATUS FOR REDUCED NOISE AND CARRIER FEEDTHROUGH IN MULTIMODE TRANSMITTER

BACKGROUND

A multitude of wireless communication systems support wide ranging needs. Many wireless communication systems supporting the same needs are incompatible. For example, there are several wireless telephone communication standards, each configured to support consumer wireless telephone communications. There are, for example, Code Division Multiple Access (CDMA) telephone systems, Time Division Multiple Access (TDMA) telephone systems, and analog telephone communication systems. Each type of telephone system may have numerous different standards for that particular type of system. However, many of the communication standards do not support interoperability with other communication standards.

There is a desire to implement a unified user device that has the ability to communicate over multiple communication systems, each supporting a distinct communication standard. Simultaneously, there is a desire to decrease the physical size and cost of the user devices, while increasing its complexity.

One manner of reducing the cost of a user device is to minimize the component count, and in particular, minimizing the number of higher priced components used in the assembly. One manner of reducing parts in a transmitter or receiver is to implement a direct conversion architecture rather than a superheterodyne architecture. A direct conversion architecture has a lower component usage when compared to the superheterodyne architecture.

However, there may be performance disadvantages associated with the direct conversion architecture, particularly when implemented in a transmitter. The disadvantages of the typical direct conversion transmitter are most evident in full duplex communication systems, where the transmitter and receiver operate simultaneously. An example of such a full duplex system is a CDMA wireless communication system. In some full duplex communication systems, the transceivers must have greater than 75 dB of dynamic range. In a CDMA communication system, the dynamic range requirement is a result of the near-far problem apparent in cellular systems.

The typical direct conversion transmitter architecture cannot meet the dynamic range requirement without requiring an external band pass filter to reduce the noise during full duplex operation. A contributor that prevents the implementation of reduced noise direct conversion architectures with >75 dB of dynamic range is carrier feedthrough.

An issue with the typical direct conversion architecture is that multiple stages of RF variable gain amplifiers are used to implement the dynamic range of the transmitter. These stages dramatically increase the noise, typically increasing the noise by greater than 20 dB over the thermal noise floor, during duplex operation and thus RF band pass filters are required. Typically, multiple RF gain stages and filters are used due to the high level of carrier feedthrough at the output.

Superheterodyne architectures present their own disadvantages. The primary deficiency of the superheterodyne architecture is high circuitry/component count. Specifically, the implementation of this architecture requires an extra oscillator, such as a Voltage Controlled Oscillator (VCO) and Intermediate Frequency (IF) band pass filter. Additionally, the RF Variable Gain Amplifier (VGA) needed to implement the dynamic range is noisy, thus requiring an RF bandpass filter for duplex operation. Because of these negative aspects of this architecture, state of the art transmitters typically do not utilize superheterodyne architectures.

Thus it is desirable to implement efficient low noise architectures that can support a host of difficult requirements, including low noise and low carrier feedthrough.

BRIEF SUMMARY

A high dynamic range reduced noise direct conversion transmitter within a multimode apparatus having multiple transmit and receive operating modes is described. The direct conversion transmitter can include a digital baseband coupled to a reduced noise direct conversion stage. A high dynamic range current folding digital to analog converter can be used to convert the digital baseband signals to analog representations. A wide dynamic range variable gain baseband amplifier couples the baseband signal to the direct conversion stage. A controllable passive attenuation stage operates to provide further gain control. Carrier feedthrough can be substantially eliminated using a carrier feedthrough cancellation loop that selectively utilizes one of a plurality of receivers configured for one of the multiple receive modes.

Embodiments of the invention provide a method and apparatus to reduce the carrier feedthrough, thus allowing the implementation of a reduced noise transmitter architecture that eliminates the need for an external band pass filter.

Aspects of the invention include a multimode apparatus configurable to support a plurality of communication standards. The apparatus includes a first transceiver configured to support a first communication mode of the plurality of communication modes, the first transceiver including a first transmitter and a first receiver, and a second receiver selectively configurable to support one of a second communication mode or a carrier feedthrough cancellation loop of the first transmitter.

Aspects of the invention include a multimode apparatus configurable to support a plurality of communication standards. The apparatus includes a first transceiver selectively configurable to support a first communication mode of the plurality of communication modes, the first transceiver including a first transmitter and a first receiver, and a second transceiver selectively configurable to support a second communication mode of the plurality of communication modes, the second transceiver including a second transmitter and a second receiver, and wherein the second receiver is configured to be a portion of a carrier feedthrough cancellation loop of the first transmitter when the multimode apparatus is configured to support the first communication mode.

Aspects of the invention include a method of canceling carrier feedthrough in a direct conversion transmitter of a multimode communication apparatus that includes determining a communication mode of the multimode communication apparatus from a plurality of communication modes, configuring a transceiver for the communication mode, and configuring a receiver distinct from the transceiver as part of a carrier feedthrough cancellation loop when the communication mode is a full duplex communication mode.

Aspects of the invention include a method of canceling carrier feedthrough in a direct conversion transmitter of a multimode communication apparatus that includes receiving an analog baseband signal, digitizing the baseband signal to generate a digital representation, applying a digital gain to the digital representation to generate an amplified digital representation, combining a DC offset to the amplified digital representation, converting the amplified digital representation with the DC offset to an analog representation, and frequency converting the analog representation to an RF signal.

Aspects of the invention include a multimode apparatus configurable to support a plurality of communication standards. The apparatus includes means for determining a communication mode of the multimode communication apparatus from a plurality of communication modes, means for configuring a transceiver for the communication mode, and means for configuring a receiver distinct from the transceiver as part of a carrier feedthrough cancellation loop when the communication mode is a full duplex communication mode.

Aspects of the invention include a multimode apparatus configurable to support a plurality of communication standards. The apparatus includes means for transmitting a transmit RF signal according to a first communication mode, means for receiving a receive RF signal according to the first communication mode, and means selectively reconfigurable for one of receiving a receive RF signal according to a second communication mode or determining a carrier feedthrough cancellation signal of the means for transmitting.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
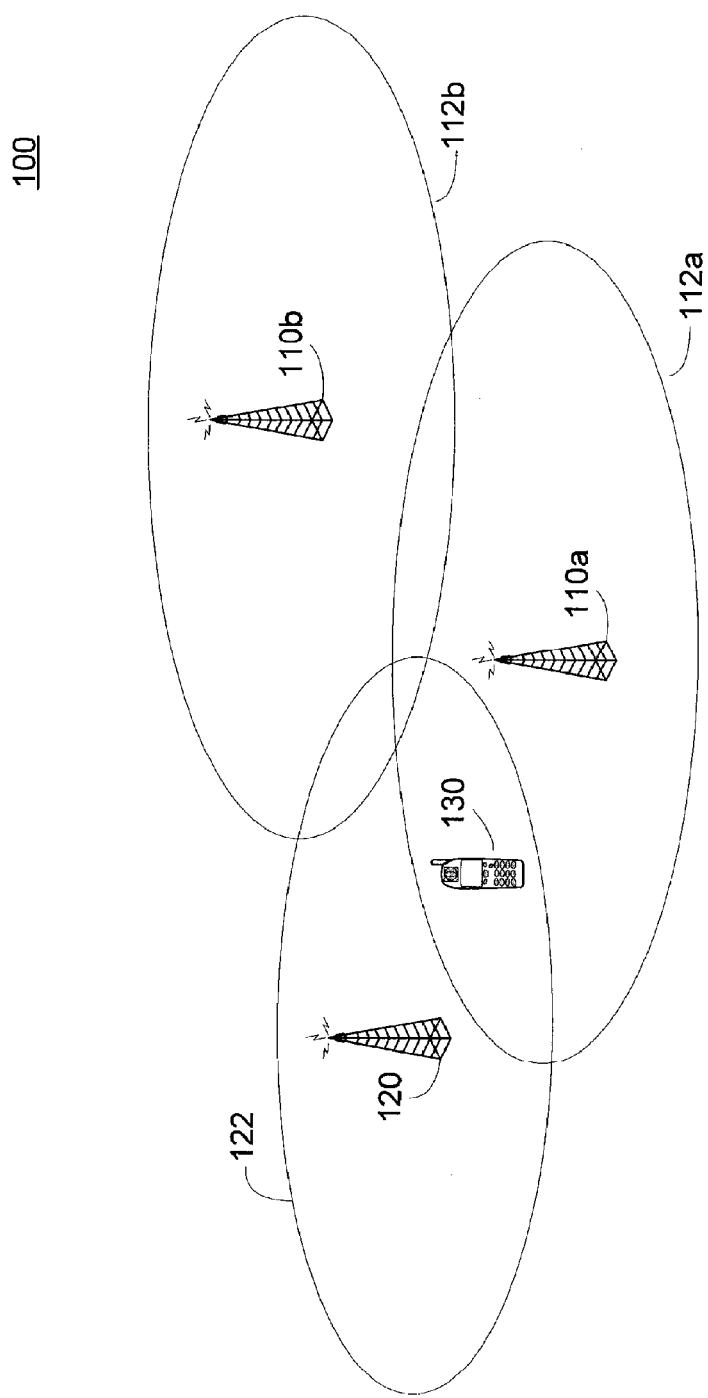
FIG. 1 is a simplified functional block diagram of an embodiment of a multimode communication system.

FIG. 1 is a simplified functional block diagram of an embodiment of a multimode wireless communication system 100. The multimode wireless communication system includes a plurality of subsystems at least a first communication subsystem and a second communication subsystem and at least one multimode communication device. The plurality of subsystems can include at least a first communication subsystem and a second communication subsystem.

A first communication subsystem can include a first base station 110a and a second base station 110b. Each base station 110a and 110b can support a corresponding coverage area 112a and 112b, respectively, that can be distinct or overlapping. Similarly, a second communication subsystem can include a base station 120 supporting a corresponding coverage area 122. Each of the base stations 110a, 110b, and 120 can be coupled to associated back end systems (not shown) that can be configured to couple the base stations 110a, 110b, and 120 to another communication system or network (not shown).

In one example, the first communication subsystem can be configured to provide wireless communications via a Time Division Multiple Access (TDMA) communication protocol in a first operating bandwidth, such as Global Systems for Mobile communication (GSM). The second communication subsystem can be configured to provide wireless communications via a Code Division Multiple Access (CDMA) communication protocol in a second operating bandwidth, such as Wideband CDMA (WCDMA). The first and second operating bandwidths can be distinct or can be overlapping.

Of course, the wireless communication system 100 is not limited to two communication subsystems, and may have more than two communication subsystems. Additionally, each communication subsystem is not limited to either TDMA or CDMA, but may be any particular communication protocol. Similarly, although the examples of the communication subsystems have been of wireless telephone communication subsystems, the wireless communication system 100 is not limited to wireless telephone communication subsystems.

A multimode communication device, here shown as a multimode user terminal 130, can be in communication with one or more of the plurality of subsystems. For example, the user terminal 130 can be configured to communicate with the base station, for example 110a, supporting the coverage area 112a in which the user terminal 130 is located.

The user terminal 130 can be configured to support multiple communication subsystems, each of which may communicate using one or more distinct communication protocols. The user terminal 130 may need to reconfigure communication protocols and radio frequencies depending on the configuration of the communication subsystems. The user terminal 130 can be configured to select the communication protocol corresponding to the communication subsystem with which it desires communication.

In another embodiment, the user terminal 130 can have a preferred hierarchy of communication subsystems, and can attempt to communicate with the communication subsystems according to the hierarchy. For example, the user terminal 130 can have a subsystem hierarchy that prefers the second communication subsystem over the first communication subsystem. The user terminal 130 can attempt to communicate using the first communication subsystem, and if it is unsuccessful, may then attempt to communicate using the second communication subsystem.

In the example of FIG. 1, the user terminal 130 is positioned in an overlapping portion of coverage areas 112a and 122 served by both the first and second communication subsystem. The user terminal 130 can attempt to communicate with the corresponding base stations 110a and 120 according to the subsystem hierarchy. For example, the user terminal 130 can initially prefer to communicate using the second communication subsystem, and therefore, can initially attempt to establish communications with the base station 120 of the second communication subsystem. If the user terminal 130 is unsuccessful, it may then attempt to establish communications with the first base station 110a of the first communication subsystem.

Although FIG. 1 illustrates the user terminal 130 in an overlapping portion of a coverage area supported by multiple communication subsystems. The user terminal 130 may have no knowledge of serving communication subsystems, and can be configured to attempt communications according to the subsystem hierarchy until communication is successful or until the user terminal 130 has attempted to connect to all subsystems.

The user terminal 130 can be a stationary terminal or can be a mobile terminal. A stationary terminal can be, for example, a desktop computer equipped with a wireless modem. A mobile terminal can be, for example, a mobile handheld terminal or a portable terminal, such as a notebook computer.

The user terminal 130 can be configured to have a high dynamic range. That is, the user terminal 130 can be configured to operate over a wide range of receive power and a wide requirement of transmit power. A wide range or high dynamic range can refer to a range that is on the order of or greater than 60 dB, 65 dB, 70 dB, 75, dB 80 dB, 85 dB, or some other range.

The user terminal 130 can maintain low noise throughout the dynamic range by implementing a high dynamic range Digital to Analog Converter (DAC) for the baseband signals and baseband gain control. Low noise can refer to a level compared to thermal noise. For example, low noise can be determined to be a noise contribution that is within 12 dB of thermal noise at room temperature. Thermal noise can be determined by the formula kTB, where k represents Boltzmann's constant ($1.3807 \times 10^{-23}$ Watt-sec/K), T represents the temperature in degrees Kelvin, and B represents bandwidth in Hertz. Thus, at a room temperature of approximately 298K, the thermal noise is approximately −174 dBm/Hz. Thus, a low noise device operating within 12 dB of thermal noise would operate with a noise floor of less than approximately −162 dBm/Hz. The baseband gain control can be analog gain control or digital gain control.

The user terminal 130 can incorporate one or more transmitters, and at least one of the transmitters can be configured as a direct conversion transmitter. Additionally, the user terminal can implement one or more receivers. The number of transmitters and receivers can be the same, and each transmitter can be paired with a particular receiver to provide a transceiver dedicated to at least one communication protocol or operating mode. In an alternative embodiment, the number of transmitters may not equal the number of receivers, and some modes of operation may be unidirectional, or some transmitters or receives may support a plurality of communication protocols or modes.

As will be discussed in further detail below, it may be advantageous to include at least two receivers to support at least two operating modes within the user terminal 130. The configuration of two receivers can be used in a carrier feedthrough cancellation loop for a particular direct conversion transmitter.

Implementing at least two receivers in a multimode user terminal 130 can be advantageous when a mode of operation is a full duplex operating mode, where the transmitter and receiver supporting the mode operate simultaneously. CDMA is an example of a communication mode utilizing full duplex operation.

Carrier feedthrough in the direct conversion transmitter can be accomplished by coupling the radio frequency (RF) output of the direct conversion transmitter to an input of a receiver tuned to the same carrier frequency. The receiver can be, for example, a receiver ordinarily configured to support a second operating mode. The receiver can downconvert the RF signal to a baseband signal such as, for example, a direct current (DC) signal. A carrier feedthrough cancellation module can operate on the DC signal and inject a processed DC signal back onto the baseband signal of the direct conversion transmitter to compensate for the carrier feedthrough. Additionally, a test DC signal can be injected into the transmitter and the DC detected at the receiver output can be compared to a threshold to determine the DC signal needed to compensate for the carrier feedthrough.

Using a second receiver allows the carrier feedthrough correction to occur during a calibration period, or during an operating period of the direct conversion transmitter. Additionally, using a second receiver ordinarily configured to support a second operating mode allows for carrier feedthrough cancellation of the direct conversion transmitter with very little additional hardware.

Figure 2:
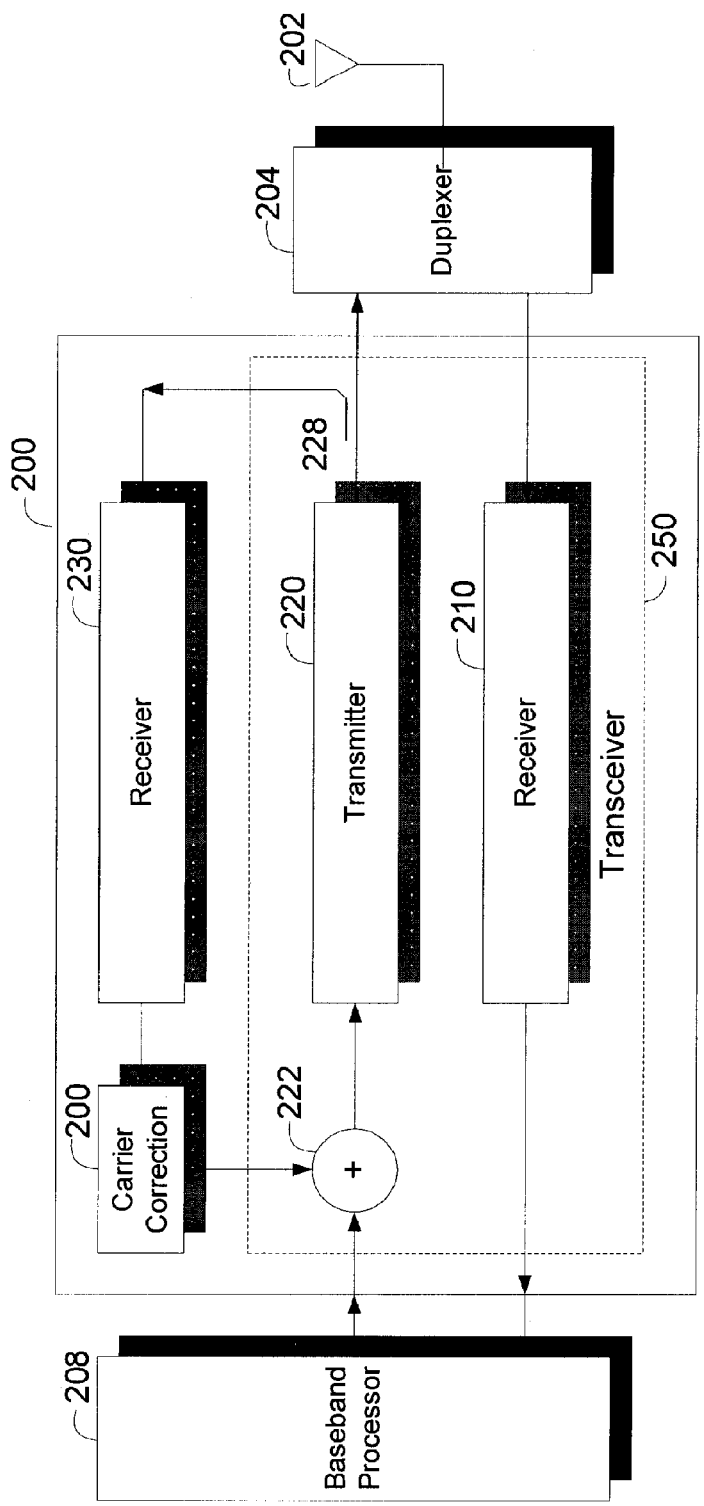
FIG. 2 is a simplified functional block diagram of an embodiment of a multimode apparatus with carrier feedthrough cancellation.

FIG. 2 is a simplified functional block diagram of an embodiment of a multimode apparatus 200 with carrier feedthrough cancellation. The multimode apparatus 200 can be combined with one or more additional devices to implement a multimode user terminal capable of supporting a plurality of communication modes. The multimode user terminal can be, for example, the user terminal shown in the multimode system of FIG. 1.

The multimode apparatus 200 shown in FIG. 2 includes one or more transceivers, transmitters, or receivers configured to support a plurality of communication modes. The multimode apparatus 200 can be, for example, a integrated circuit (IC), set of integrated circuits typically referred to as a chip set, one or more ICs with associated external elements, and the like, of some other means for supporting multiple communication modes.

The multimode apparatus 200 can include frequency translation, filtering, and amplification stages. The multimode apparatus 200 shown in FIG. 2 is configured to interface one or more baseband processors 208 with a radio frequency (RF) portion, that can include a duplexer 204 coupled to an antenna 202.

In one embodiment, a baseband processor 208 can be configured to select or otherwise determine a particular communication mode from a plurality of supported communication modes. The baseband processor 208 can configure its internal processing for the selected communication mode, and can be configured to provide one or more control signals, messages, or indicators (not shown) to the multimode apparatus to indicate the selected communication mode.

The baseband processor 208 can be configured to process signals for transmission to corresponding receivers configured to communicate according to the selected communication mode. The baseband processor 208 can be configured to filter, amplify, encode, and modulate the signals for transmission according to the selected communication mode. For example, the baseband processor 208 can be configured to process files, or signal input by a user, and process the files, data, or signals for transmission to a corresponding receiver or the communication mode. The user signals can be, for example, user voice signals, and the baseband processor 208 can be configured to select a wireless telephone communication mode, such as a WCDMA mode, and can be configured to process the user voice signals according to the WCDMA communication mode.

Additionally, the baseband processor 208 can be configured to process the baseband signals received by the user terminal in order to recover the underlying signals. For example, the baseband processor 208 can be configured to demodulate, amplify and decode the received baseband signals to recover data, voice, control information, or some other type of received information.

The multimode apparatus 200 can configure the internal elements to support the selected communication mode. In one embodiment, the multimode apparatus 200 can receive the one or more control signals from the baseband processor 208 and can configure the internal elements to support the selected communication mode. In another embodiment, the baseband processor 208 can control the particular configuration of the multimode apparatus 200 without any knowledge of the communication mode by the multimode apparatus 200. In another embodiment, the baseband processor 208 can control some of the elements within the multimode apparatus 200, and the multimode apparatus 200 can be configured to reconfigure other elements based on one or more control signals.

The multimode apparatus 200 receives baseband signals from the baseband processor 208. The multimode apparatus 200 couples the transmit baseband signals to the appropriate transmitter 220 corresponding to the selected communication mode. In the embodiment shown in FIG. 2, the multimode apparatus 200 couples the transmit baseband signals to a signal summer 222 that is part of a carrier feedthrough cancellation control loop. The output of the signal summer 222 is coupled to the input of the transmitter 220.

The transmitter 220 can be a transmit portion of a transceiver 250 configured to support the selected communication mode. Alternatively, the transmitter 220 can be a distinct transmitter, particularly if the selected communication mode supports only the transmit communication path, or if the transmit communication mode or path can be selected independent of the receive communication mode or path.

The transmitter 220 performs the frequency translation, filtering, and amplification of the baseband signals. The transmitter 220 outputs a transmit RF signal corresponding to the input baseband signal.

In the embodiment of FIG. 2, the multimode apparatus 200 couples the transmit RF signal to a duplexer 204. The duplexer 204 can be configured to concurrently route transmit RF signals to a common port and receive RF signals from the common port to a receive port of the duplexer 204. The duplexer 204 is typically configured to provide a predetermined level of isolation between the transmit and receive ports. The common port of the duplexer 228 is coupled to an antenna 202.

The transmit RF signal is coupled from the transmitter 220 to the antenna 202 via the duplexer 204. In the embodiment of FIG. 2, the output of the transmitter 220 is coupled to a coupler 228, which can be a directional coupler. The transmit RF signal is coupled from the output of the coupler 228 to the transmit port of the duplexer 204.

The receive signal path is complementary to the transmit signal path. Receive RF signals according to one of the communication modes are received at the antenna 202. The receive RF signals can be transmitted, for example, by one of the base stations shown in the system of FIG. 1.

The antenna 202 couples the receive RF signals to the common port of the duplexer 204. The duplexer 204 routes the receive RF signals to its receive port, where the signals are coupled to a receiver 210 in the multimode apparatus 200.

The receiver 210 operates to filter, amplify, and frequency translate the receive RF signals to receive baseband signals. The receiver 210 couples the receive baseband signals to the baseband processor 208 for further processing.

When the multimode apparatus 200 is configured to support a communication mode that features full duplex operation, the transmitter 220 and receiver 210 concurrently operate on the associated signals. The receiver 210 cannot be used to compensate for carrier feedthrough in the transmitter 220 without sacrificing at least some of the received signal. For example, the multimode apparatus 200 could be configured to time division multiplex the operation of the receiver 210 between processing the received signal and processing the transmit RF signal for carrier feedthrough. However, in such a configuration, the receiver 210 necessarily loses the information that is received during the period of time that it is configured for carrier feedthrough cancellation. Thus, such a time multiplex control of the receiver 210 may not be desirable.

The embodiment of FIG. 2 illustrates a second receiver 230 configured to support carrier feedthrough cancellation. In one embodiment, the second receiver 230 can be a receiver that is dedicated to the carrier feedthrough cancellation loop. However, this is likely an inefficient utilization of resources.

The second receiver 230 can be a receiver that is selectively controlled to support a second communication mode or the carrier feedthrough cancellation loop of the first communication mode. Using a second receiver 230 that is already present in the multimode apparatus 200 is a more efficient utilization of resources.

The multimode apparatus 200 can be configured to support one of the plurality of communication modes at any given instant. However, the multimode apparatus 200 can include a plurality of transceivers, transmitters, or receivers in order to support all possible communication modes. Some processing stages may be idle during the period that the multimode apparatus 200 is configured for a particular communication mode.

For example, the second receiver 230 can be configured to process received RF signals according to a second communication mode. The second receiver 230 can be part of a second transceiver (not shown) or can be a distinct receiver, such as when the second communication mode supports only the receive direction, or if the second receiver 230 can be associated with any one of multiple transmitters. The second receiver 230 can also be a receiver used to support diversity operation for the first communication mode when needed.

When the multimode apparatus 200 is configured to support a first communication mode, the second receiver 230 may not have any received RF signals to process. The multimode apparatus 200 capitalizes on the otherwise idle second receiver 230 by reconfiguring the second receiver 230 to operate as part of the carrier feedthrough cancellation loop for the first transmitter 220.

The transmit RF signal from the first transmitter 220 is coupled to the input of the second receiver 230 via the coupler 228. For example, when the coupler 228 is a directional coupler, the through path of the coupler 228 can couple the transmit RF signal from the transmitter 220 to the duplexer 204. The forward coupling path of the coupler 228 can be an attenuated version of the transmit RF signal, and can be, for example, 20 dB lower than the transmit RF signal.

The second receiver 230 is tuned to frequency convert the carrier feedthrough signal to a DC baseband signal. The second receiver 230 can be configured, for example, to perform a substantially opposite frequency translation performed in the transmitter 220. In one embodiment, the second receiver 230 is a direct downconversion receiver, and the Local Oscillator (LO) used to downconvert the transmit RF signal to a baseband signal is substantially the same as the LO used in the transmitter 220 to upconvert the transmit baseband signal.

The second receiver 230 can be configured to couple its output to a carrier correction module 240 when the second receiver 230 operates as part of the carrier feedthrough cancellation loop. The carrier correction module 240 processes the DC signal component output by the second receiver 230 and couples the processed DC signal to a second input of the signal summer 222 at the input to the transmitter 220. In one method of operation, the carrier correction module 240 will introduces DC offsets at the second input of the signal summer 222 in order to minimize the DC offset measured in receiver 230 which also reduces the carrier feedthrough. Alternatively, the carrier correction module 240 can compare the DC signal component output by the second receiver 230 to thresholds in response to test input DC signals at the second input of the signal summer 222 to determine the DC signal to apply at the input of the transmitter 220. The carrier correction module 240 can then introduce successive approximations at the second input of the signal summer 222 in order to minimize the DC offset in the second receiver 230 which also reduces the carrier feedthrough.

In one embodiment, the carrier correction module 240 can vary a gain applied to the DC signal component to minimize the carrier feedthrough.

The multimode apparatus 200 can continuously perform carrier feedthrough cancellation using the second receiver 230 when the multimode apparatus 200 is controlled to support the first communication mode. Alternatively, the transmit RF signal from the transmitter 220 can be periodically coupled to the input of the second receiver 230, and the carrier correction module 240 can be configured to update the correction value during those periods that the transmitter 220 output is coupled to the second receiver 230.

Figure 3:
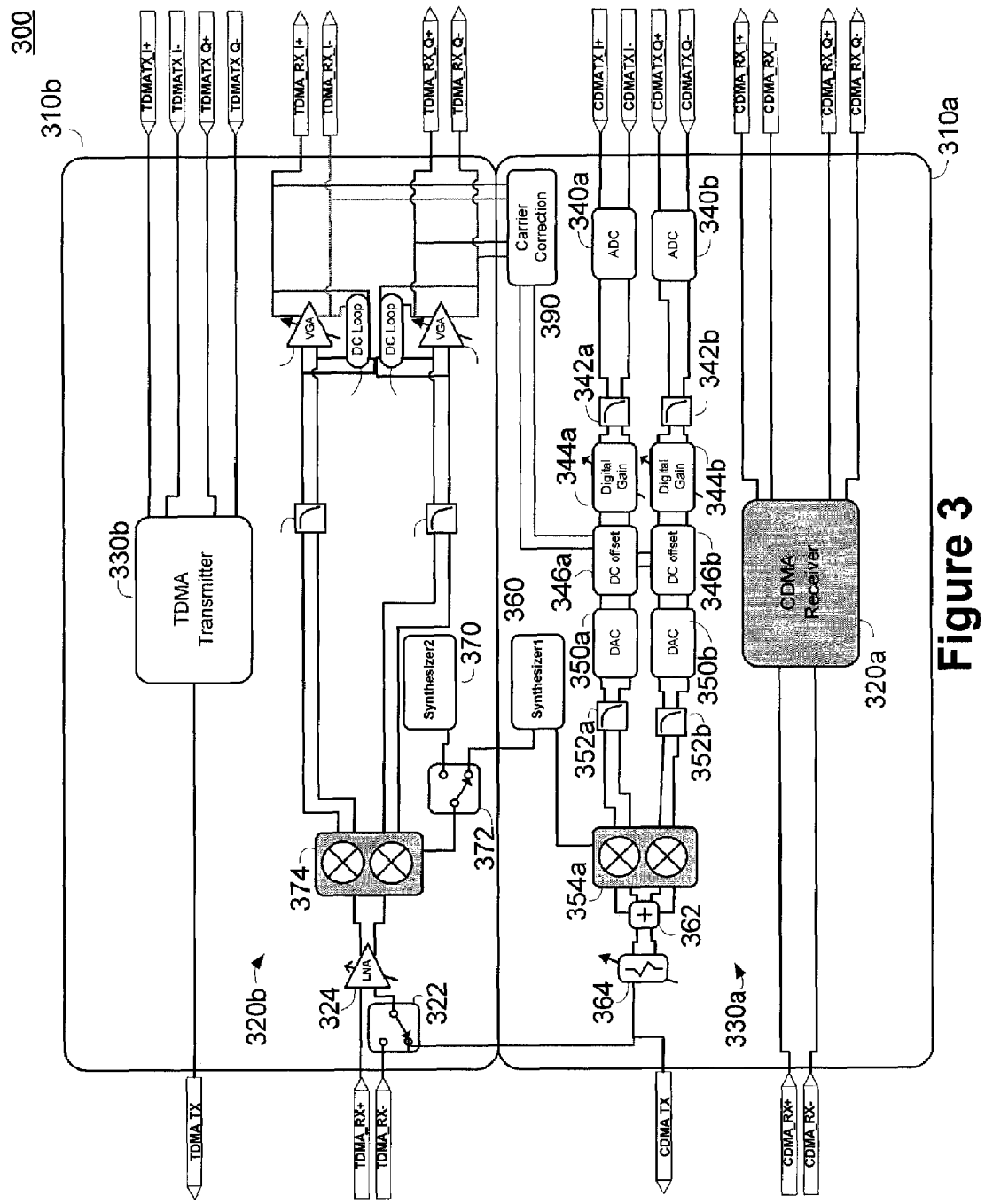
FIG. 3 is a simplified functional block diagram of an embodiment of a multimode communication apparatus with high dynamic range and carrier feedthrough cancellation.

FIG. 3 is a simplified functional block diagram of an embodiment of a multimode apparatus 300 with high dynamic range, reduced noise, and carrier feedthrough cancellation. The multimode apparatus 300 can be used with additional devices to implement the user terminal of FIG. 1. In the embodiment of FIG. 3, the multimode apparatus 300 is configured to support two distinct communication modes, TDMA and CDMA. Of course, the multimode apparatus 300 is not limited to supporting only two communication modes, and is not limited to supporting bi-directional communication modes.

The multimode apparatus 300 can be implemented in a single semiconductor substrate of a single IC, and can perform the signal processing necessary to frequency convert baseband signals to RF signals, and received RF signals to baseband signals. In other embodiments, the multimode apparatus 300 can be implemented as a chip set, a combination of one or more ICs and external elements, a combination of elements, and the like.

The multimode apparatus 300 includes a first transceiver 310a and a second transceiver 310b. The first transceiver 310a includes a first receiver 320a and a first transmitter 330a. Similarly, the second transceiver 310b includes a second receiver 320b and a second transmitter 330b. In one embodiment, the first transceiver 310a is configured to support a CDMA communication mode, and the second transceiver 310b is configured to support a TDMA communication mode.

Additionally, the second receiver 320b is configured to operate as a portion of a carrier feedthrough cancellation loop of the first transmitter 330a when the multimode apparatus 300 is configured for the first communication mode, such as CDMA, which supports full duplex operation.

When the multimode apparatus 300 is configured for the second communication mode, TDMA in this example, the second transceiver 310b is active and the first transceiver 310a can be idled, or otherwise powered down. The second transmitter 330b accepts in-phase (I) and quadrature (Q) transmit baseband signals and frequency translates them to a composite transmit RF signal at a desired frequency.

The second receiver 320b is configured to support the second communication mode. A switch 322 at the front end of the second receiver 320b is controlled to couple a receive RF signal to the processing portion of the second receiver 320b. In another embodiment, the switch 322 may be omitted, and the receive RF signal can be coupled directly to the LNA 324 in the processing portion of the second receiver 320b. In other embodiments, the receive RF signal can be coupled to some other device (not shown), such as a combiner, coupler, attenuator, diplexer, filter, and the like, that operates to couple the receive RF signal to the processing portion of the second receiver 320b. A low noise amplifier (LNA) 324 amplifies the receive RF signal and couples the amplified signal to I and Q mixers 374.

A frequency synthesizer 370 is controlled to tune to the desired RF frequency. A LO switch 372 is controlled to couple the output of the synthesizer 370 to the I and Q mixers 374 to frequency convert the desired signal to a baseband signal. The baseband I and Q signals are coupled to lowpass filters 382a and 382b to remove undesired signal and noise components that are outside of the desired bandwidth.

The output of the lowpass filters 382a and 382b are coupled to I and Q Variable Gain Amplifiers 384a and 384b. The output of the lowpass filters 382a and 382b are also coupled to I and Q DC offset correction loops 386a and 386b that operate to remove the DC offset from the downconverted signal. The output of the I and Q VGAs 384a and 384b are coupled to the output of the second receiver 320b.

When the multimode apparatus 300 is controlled to support a first communication mode, such as CDMA, the first receiver 320a is configured to receive RF signals, for example from an antenna, and frequency translate the RF signals to I and Q baseband signals in much the same manner as the second receiver 320b.

The first transmitter 310a is controlled to accept I and Q baseband signals and frequency translate them to a composite RF signal at a desired carrier frequency. The second receiver 320b is controlled to operate as a portion of the carrier feedthrough cancellation loop of the first transmitter 310a.

In the embodiment of FIG. 3, the first transmitter 310a is controlled to accept analog I and Q baseband signals. The analog I and Q baseband signals can be normalized or may otherwise span a relatively small dynamic range of amplitudes. The first transmitter 310a processes the I signal path substantially identical to the Q signal path. Thus, the discussion will focus primarily on the I signal path for the sake of brevity.

The in-phase baseband signal is coupled to an Analog to Digital Converter (ADC) 340a that is configured to transform the signal to a digital representation. The ADC 340a can have a fixed reference voltage or reference current that is determined based on the predetermined dynamic range of the input signal.

The digitized output is coupled to a filter 342a, where undesired signal components outside of the desired signal band are removed or otherwise attenuated. The filter 342a can be a lowpass filter and can be, for example, a digital filter such as a Finite Impulse Response (FIR) filter, an Infinite Impulse Response (IIR) filter, a Kalman filter, a combination of filters, and the like, or some other means for filtering.

The output of the filter 342a is coupled to a digital gain module 344a that is configured to provide variable gain. The digital gain module 344a can be configured, for example, to operate in a gain control loop, that can have a open loop component and a closed loop component. The digital gain module 344a can be configured to amplify the baseband signal over a desired gain control range that can span greater than, for example, 20 dB, 25 dB, 30 dB, 35 dB, 40 dB or more.

The output of the gain control module 344a is coupled to an input of a DC offset control module 346a. The DC offset control module 346a can be configured to sum a DC offset provided by the carrier correction module 390 with the baseband signal. Because a DC baseband signal upconverts to the carrier frequency, the amount of carrier feedthrough can be compensated by manipulating the DC offset at the baseband signal.

The output of the DC offset control module 346a is coupled to a Digital to Analog Converter (DAC) 350a. Because the DAC 350a is positioned after the baseband gain control, the DAC 350a converts a baseband signal that spans a dynamic range that corresponds to the sum of the dynamic ranges of the input baseband signal, the gain control, and the DC offset.

The DAC 350a can be a current multiplying DAC, and can be, for example, a current folding DAC such as described in Zhou, Yijun and Jiren Yuan, "*A Low Distortion Wide Band CMOS Direct Digital RF Amplitude Modulator*", ESSCIRC 2003, incorporated herein by reference in its entirety. Such a current folding DAC has a dynamic range sufficient to maintain linearity without introducing excessive noise.

The analog output of the DAC 350a is coupled to a filter 352a that is configured to remove or otherwise attenuate signals outside the desired signal bandwidth. The filter 352a can be, for example, a lowpass filter.

The output of the filter 352a is coupled to a frequency translation module that can include, for example, I and Q mixers 354 that operate to frequency convert the baseband I and Q signals to a desired RF. A frequency synthesizer 360 operates at the desired RF carrier frequency to drive the LO ports of the mixers 354.

The I and Q outputs of the mixers 354 are coupled to a signal combiner 362 that can be, for example a signal summer. The output of the signal combiner 362 is coupled to an attenuator 364. The attenuator 364 can be configured to extend the dynamic range of the signal without introducing additional noise to the signal. The output of the attenuator 364 is the output of the first transmitter 310a. The output of the first transmitter 310a can be coupled to a duplexer or antenna (not shown).

The baseband signal may be controllable over a dynamic range that does not span the entire desired dynamic range of the RF signal. The attenuator 364 can extend the low end of the dynamic range without introducing significant noise to the signal. For example, an RF amplifier used to extend the upper portion of the dynamic range can introduce noise by amplifying the noise floor determined in the baseband processing stages and decreasing the carrier to noise ratio by a portion of the amplifier noise figure.

The output of the attenuator 384 is also coupled to an input of the switch 322 of the second receiver 320b. The switch 322 is controlled to couple the output of the first transmitter 310a to the processing portion of the second receiver 320b. The second receiver 320b operates to downconvert the carrier frequency to a DC signal.

In an alternative embodiment, the switch 322 is omitted. An amplifier, such as an LNA (not shown) can operate to couple the output of the first transmitter 310a from the attenuator 384 to the input of the I and Q mixers 374 of the second receiver 320b. Thus, an LNA can be used to couple the transmit signal to the processing portion of the second receiver 320b, past the LNA 324 of the second receiver 320b.

In other embodiments, the switch 322 is omitted, and the output of the first transmitter 310a is coupled to the signal processing path of the second receiver 320b using an amplifier, coupler, summer, combiner, filter, diplexer, and the like, or some combination thereof. Additionally, the output of the first transmitter 310a can be coupled to the second receiver 320b at the input of the LNA 324, the I and Q mixers 374, or some other point in the signal processing path of the second receiver 320b.

The LO switch 372 of the second receiver 320b operates to couple the output of the synthesizer 360 of the first transmitter 310a to the I and Q mixers 374 of the second receiver 320b. The second receiver 320b can be guaranteed to downconvert the carrier output from the first transmitter 310a to DC, because the same synthesizer 360 is used for both the upconversion in the first transmitter 310a and the frequency downconversion in the second receiver 320b.

The second receiver 320b processes the signal coupled from the first transmitter 310a in much the same manner as described above. However, the I and Q DC offset correction loops 386a and 386b do not operate to remove the DC offset attributable to the carrier feedthrough. The carrier compensation module 390 may initially sample the DC offset of the second receiver 320b in order to remove the systematic offset of the second receiver 320b during the carrier correction process. Alternatively, before the first transmitter 310a signal is coupled to the second receiver 320b the I and Q DC offset loops may operate in order to remove the systematic DC offset of the receiver 320b. This DC correction will then be held while the first transmitter 310a signal is coupled to the second receiver 320b. The DC offset attributable to the carrier feedthrough is coupled to the carrier compensation module 390 that operates to process the DC signals on the I and Q signal paths before coupling the processed DC signals to the corresponding I and Q DC offset modules 346a and 346b in the first transmitter 310a.

The carrier compensation module 390 can operate to null the carrier feedthrough from the first transmitter 310a. In one embodiment, the carrier compensation module 390 implements a digital state machine that operates to determine the values of the DC offsets needed to substantially null the carrier feedthrough. In one embodiment, the digital state machine can operate to perform a search of the gains applied to the DC signals at the I and Q signal paths to null the carrier feedthrough. In another embodiment, the digital state machine can operate to systematically step through a predetermined range of DC offset values in response to the DC value obtained by downconverting the transmit RF signal. In another embodiment, the digital state machine can step through a predetermined set of DC offset values in groups where the values in the group that minimizes the measured DC value is added to an I register and Q register that is subsequently applied at the DC offset modules 346a and 346b respectively. Alternatively, the values that are added to the I and Q registers can be determined by comparing the measured DC offset values to a threshold and mapping the results of these comparisons to I and Q DC offset values using a look up table. The digital state machine implements this procedure in an iterative fashion with decreasing DC levels until the values in the I and Q registers converge or the loop completes a predetermined number of iterations. In other embodiments, the carrier compensation module 390 can implement other means for determining the DC offset required to substantially null the carrier feedthrough.

Figure 4A:
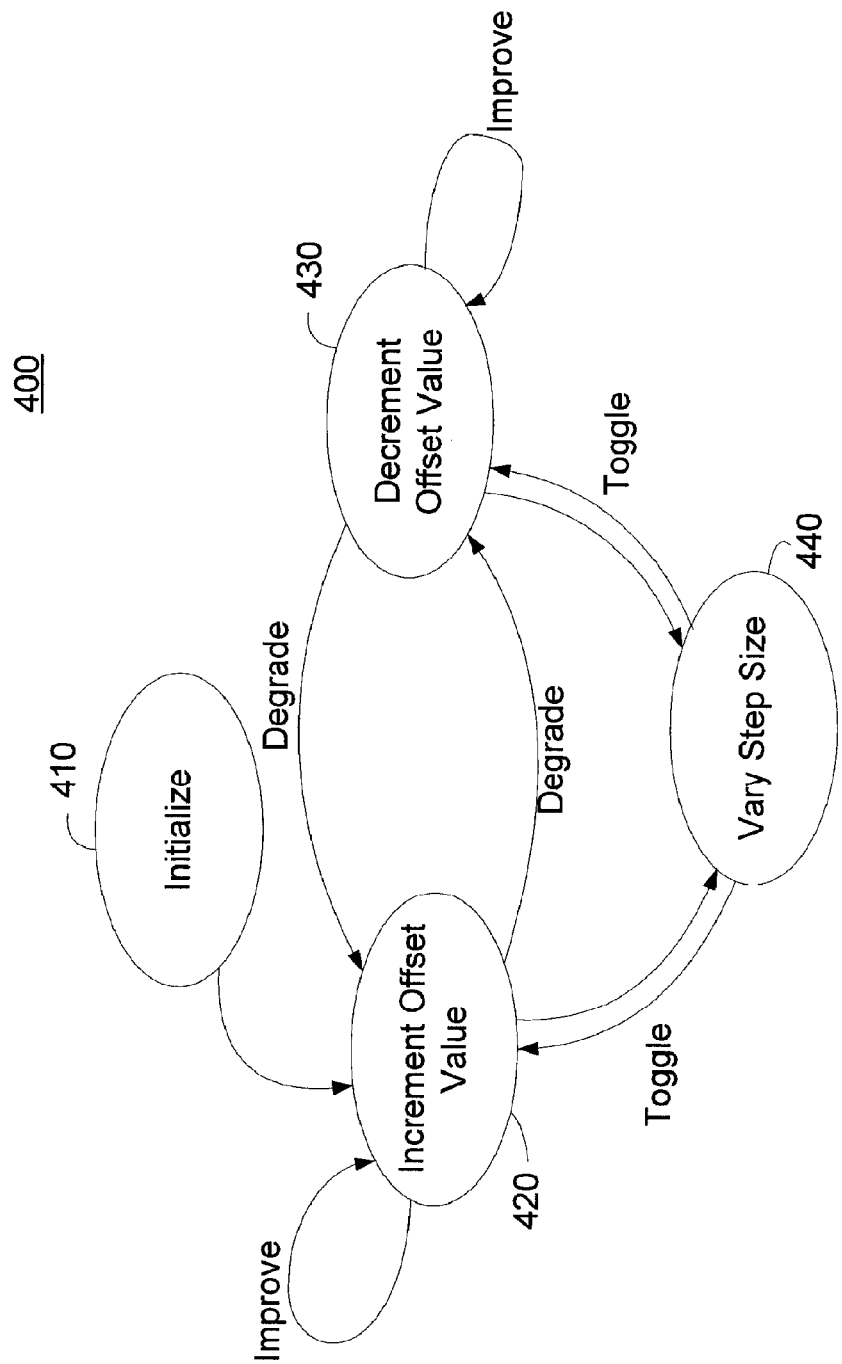
FIG. 4A is a simplified state machine for canceling carrier feedthrough.

FIG. 4A is a simplified state machine 400 for canceling carrier feedthrough that can be implemented by the carrier compensation module of FIG. 3. The state machine 400 is configured to determine the proper DC offsets to apply to the I and Q baseband inputs in order to null the carrier feedthrough at the transmitter. The state machine 400 can examine the DC value determined by the second receiver when determining whether changes improve or degrade the carrier feedthrough.

The state machine 400 begins at state 410 where the carrier compensation module initializes the state machine 400. The carrier compensation module can be configured to periodically perform nulling of the carrier feedthrough, and can be configured to maintain a previously determined nulling value during the portion of time that the carrier compensation module is not actively engaged in canceling of the carrier feedthrough.

At the initialization state 410, the initial parameters of the nulling process can be set. For example, the initial DC values supplied to the I and Q signal paths can be initially selected to be the most recent values, and an initial increment or decrement step size can be set to a default value.

The state machine 400 can transition to a DC value adjustment state, here shown as the increment state 420 following initialization. In other embodiments, the state machine 400 may transition to the decrement state 430 following initialization.

In the increment state 420, the state machine 400 increments the DC offset values by the step size. The increment state 420 then determines if the carrier feedthrough improved or degraded based on the change in DC offset values. The state machine 400 can examine, for example, the DC value output from the second receiver that represents the carrier feedthrough.

If the carrier feedthrough improves, the state machine 400 stays in the increment state 420. If the carrier feedthrough degrades, the state machine 400 transitions to the decrement state 430. In the decrement state 430, the state machine 400 decrements the DC offset values by the step size. The decrement state 430 then determines if the carrier feedthrough improved or degraded based on the change in DC offset values.

The increment state 420 can also determine that the step size is resulting in the carrier feedthrough toggling between the increment and decrement states 420 and 430, due to the step size. If the increment state 420 determines that state toggling is occurring, the state machine 400 transitions to the step size state 440, where the step size is decreased by a predetermined amount. The predetermined amount can be a fixed value or can be a relative value. For example, the step size state 440 can decrease the step size by halving the current step size.

The step size state 440 can then return to the state, for example the increment state 420, from which it initially transitioned. For example, if the state machine 400 transitioned to the step size state 440 from the decrement state 430, the state machine 400 would transition back to the decrement state 430 following updating of the step size.

The step size state 440 can be determined to determine a minimum step size, and can inform the state machine 400 when the minimum step size has been achieved. If the state machine 400 toggles between increment and decrement states 420 and 430 and is at the minimum step size, the state machine has converged to the carrier feedthrough null.

Figure 4B:
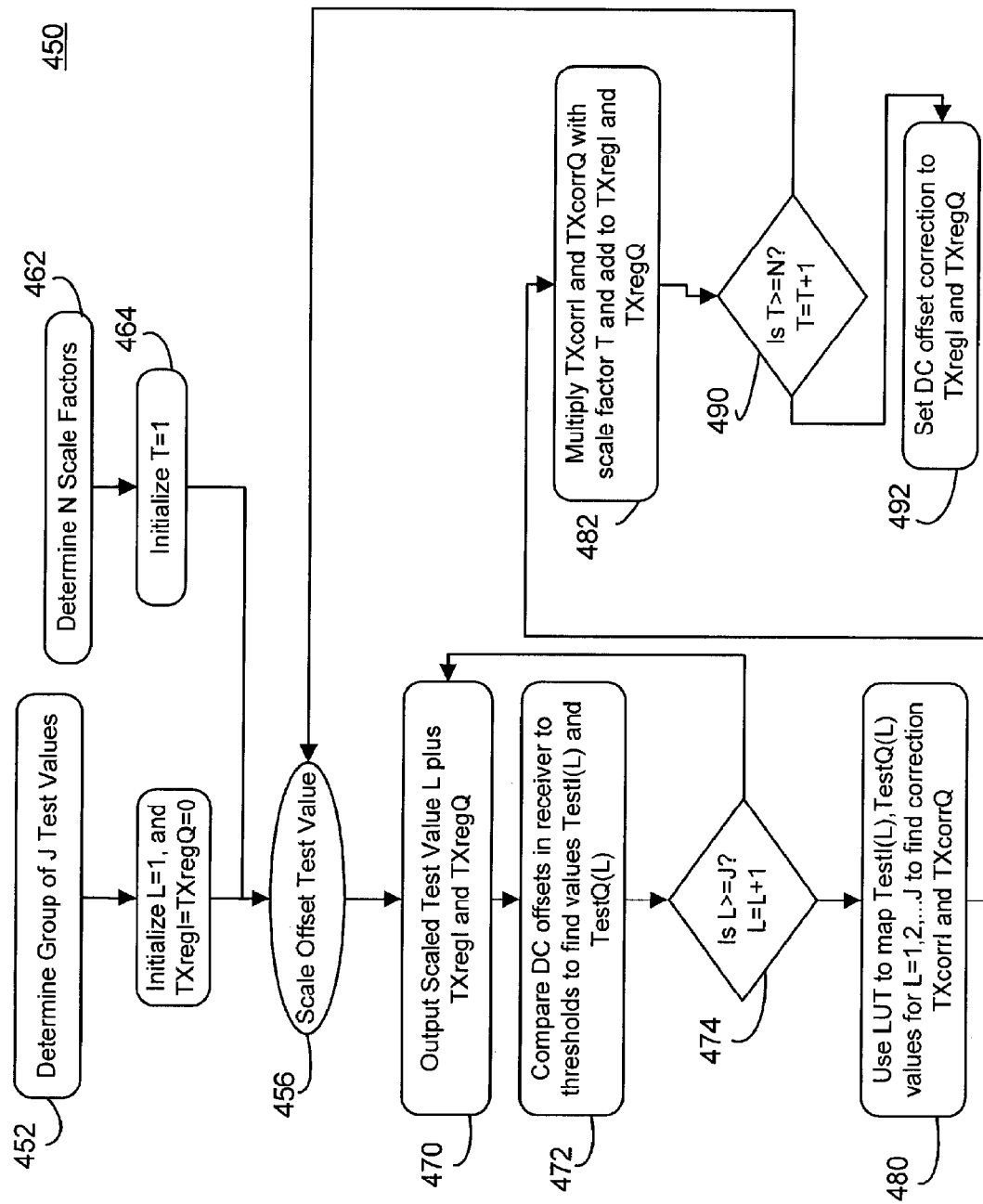
FIG. 4B is a simplified flowchart of an embodiment of a method of determining a DC offset correction for carrier feedthrough cancellation.

FIG. 4B is a simplified flowchart of an embodiment of a method 450 of determining a DC offset correction for carrier feedthrough cancellation. The method 450 can be performed, for example, by the carrier compensation module of FIG. 3.

The carrier compensation module uses the method 450 to inject DC offset values into the transmitter. The resultant DC offset detected at the receiver output can be compared to a threshold to determine the DC signal needed to compensate for the carrier feedthrough. The carrier compensation module implements this procedure in an iterative fashion with decreasing DC injection levels until the values in the I and Q registers converge or the loop completes a predetermined number of iterations.

The compensation correction values can periodically execute the method 450 to update the carrier feedthrough compensation values. Alternatively, the compensation correction values can execute the method 450 according to some predetermined event or control.

The method 450 begins at block 452 where the carrier compensation module initially determines a group of J test values. The test values can be indicative of the possible polarities of the DC offset used for carrier cancellation, and can include a default value of zero. For example, in a transmitter configured with distinct in-phase (I) and quadrature (Q) signal paths, as shown in FIG. 3, each test value can include a corresponding I and Q value. Therefore, four test values can be used to support all possible polarity combinations of I and Q offset values. These values can be normalized values and thus can include the set of $(I,Q)=(1, 1)$, $(1,-1)$, $(-1,1)$, and $(-1,-1)$ as well as the degenerate test value $(0,0)$.

After determining a group of J test values, the carrier compensation module proceeds to block 454 and initializes a counter or pointer used to track the test values for use in determining the carrier feedthrough compensation DC offset value. The carrier compensation module also initializes a compensation correction values stored in registers to zero.

The carrier compensation module, at block 462, can concurrently or serially determine a set of scale factors. The scale factors can be an initial scale factor and scale factors divided by successively larger powers of two. For example, the carrier compensation module can determine an initial scale factor of 20, and can determine successive smaller scale factors of $20/2, 20/4, 20/8, \ldots 20/(2^N)$. The carrier compensation module can proceed to block 461 after determining the scale factors and can initialize a scale factor counter or pointer that tracks the presently active scale factor.

After initializing the test value pointer and the scale factor pointer, the carrier compensation module proceeds to block 456 to scale the presently active test value by the presently active scale value. The carrier compensation module proceeds to block 470 and adds the scaled test value to the stored DC offset correction values retrieved from memory. The carrier compensation module outputs the value to one or more DC offset control modules in the transmitter baseband.

The carrier compensation module proceeds to block 472 to compare the resultant DC offset output by the receiver in response to the DC offsets injected into the transmitter baseband. The carrier compensation module stores the received DC offset values in a table at a location corresponding to the test value and scale value.

The carrier compensation module proceeds to decision block 474 to determine if all test values have been applied with the presently active scale factor. If not, the carrier compensation module increments the test value pointer to point to the next test value and returns to block 470.

If, at decision block 474, the carrier compensation module determines that all test values have been scaled by the presently active scale factor and the corresponding receiver DC offset values monitored, the carrier compensation module proceeds to block 480.

At block 480, the carrier compensation module uses a look up table to map each of the received DC offset values associated with the corresponding test value to determine a DC offset correction value.

The carrier compensation module proceeds to block 482 and scales each of the DC offset correction values determined from the look up table by the presently active scale factor. The carrier compensation module adds this scaled value to the compensation correction values stored in memory.

The carrier compensation module proceeds to decision block 490 to determine if all scale factors have been applied. If not, the carrier compensation module increments the scale factor pointer to point to the next smaller scale factor. The carrier compensation module then returns to block 456 to repeat the test value scaling and comparison process.

If, at decision block 490, the carrier compensation module determines that all scale factors have been applied to the test values, the carrier compensation module proceeds to block 492 and the value of DC offset that corrects the carrier feedthrough is the value stored in memory as the compensation correction values. The method 450 is then complete.

Figure 5:
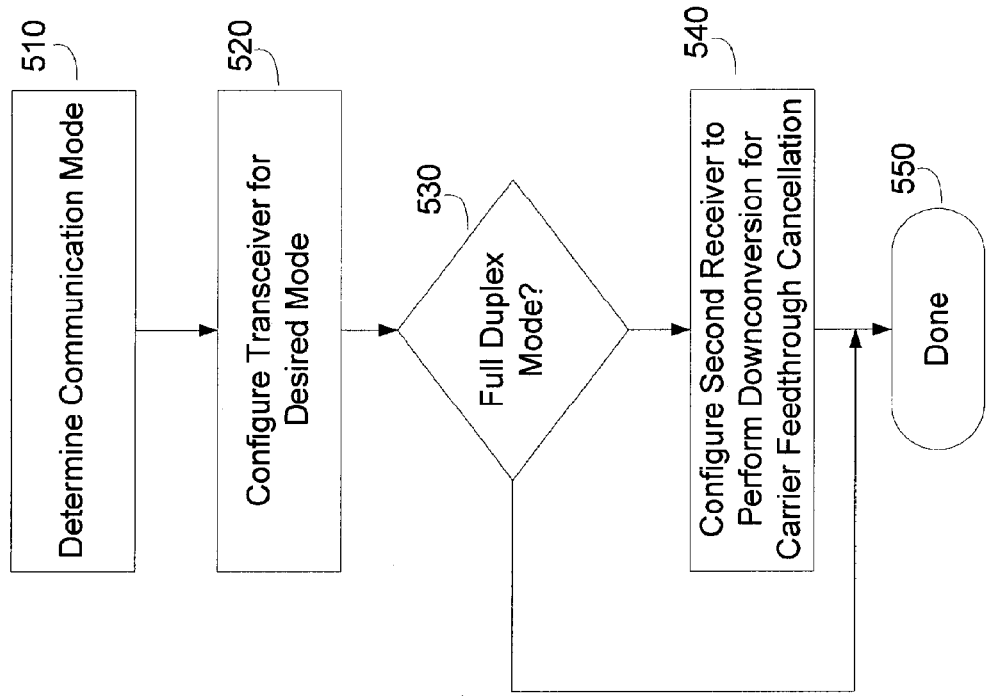
FIG. 5 is a simplified flowchart of an embodiment of a method of canceling carrier feedthrough in a direct conversion transmitter in a multimode communication apparatus.

FIG. 5 is a simplified flowchart of an embodiment of a method 500 of canceling carrier feedthrough in a direct conversion transmitter in a multimode communication apparatus. The method 500 can be performed, for example, by the multimode apparatus of FIG. 2 or FIG. 3.

The method begins at block 510 where the multimode apparatus determines a communication mode. The multimode apparatus can be configured, for example to receive one or more control signals or can be configured to read one or more status indicators.

After determining the communication mode, the multimode apparatus proceeds to block 520 and configured the multimode apparatus for the desired communication mode. In particular, the multimode apparatus can configure one of a plurality of transceivers for the desire d communication mode. The multimode apparatus can de-energize or otherwise place in a low power or sleep state portions or all of those transceivers that are not used to support the desired communication mode.

The multimode apparatus proceeds to decision block 530 to determine if the desired communication mode supports full duplex communication. In full duplex communication, the transmit and receive communications may occur simultaneously. For example, in a CDMA communication mode, the transmit communication link and receive communication link can be simultaneously and continuously active.

The multimode apparatus can determine if the communication mode is a full duplex communication mode, for example, based on a look up table or indicator that is set when the communication mode is selected. If the multimode apparatus determines that the communication mode is not a full duplex communication mode, the multimode apparatus proceeds from decision block 530 to block 550 and the method 500 is done.

In such a communication mode, the multimode apparatus can multiplex the operation of the receiver associated with the transmitter. The receiver can support the communication mode during active periods and can support carrier feedthrough cancellation during the inactive periods.

If, at decision block 530, the multimode apparatus determines that the desired communication mode is a full duplex communication mode, the multimode apparatus proceeds to block 540 and configures a second receiver to perform a portion of the functions required in a carrier feedthrough cancellation loop.

The second receiver can be, for example, a receiver in a transceiver that is used to support a second communication mode. The multimode device can configure the apparatus such that the output of the transmitter supporting the desired communication mode is coupled to the input of the second receiver. The LO signal used to upconvert baseband signals to the transmit RF output is coupled to the second receiver. The second receiver thus can use the same LO signal to downconvert the transmit output signal to a baseband signal. The DC value at the resultant baseband signal is indicative of the carrier feedthrough at the transmitter output. The DC output of the second receiver is coupled to The multimode apparatus can periodically null the carrier feedthrough using the second receiver and a carrier compensation module that operates on the DC signal that is representative of the carrier feedthrough. The carrier feedthrough compensation and cancellation can occur during the period that communications using the desired communication mode are active. The multimode apparatus proceeds to block 550 and is done.

Figure 6:
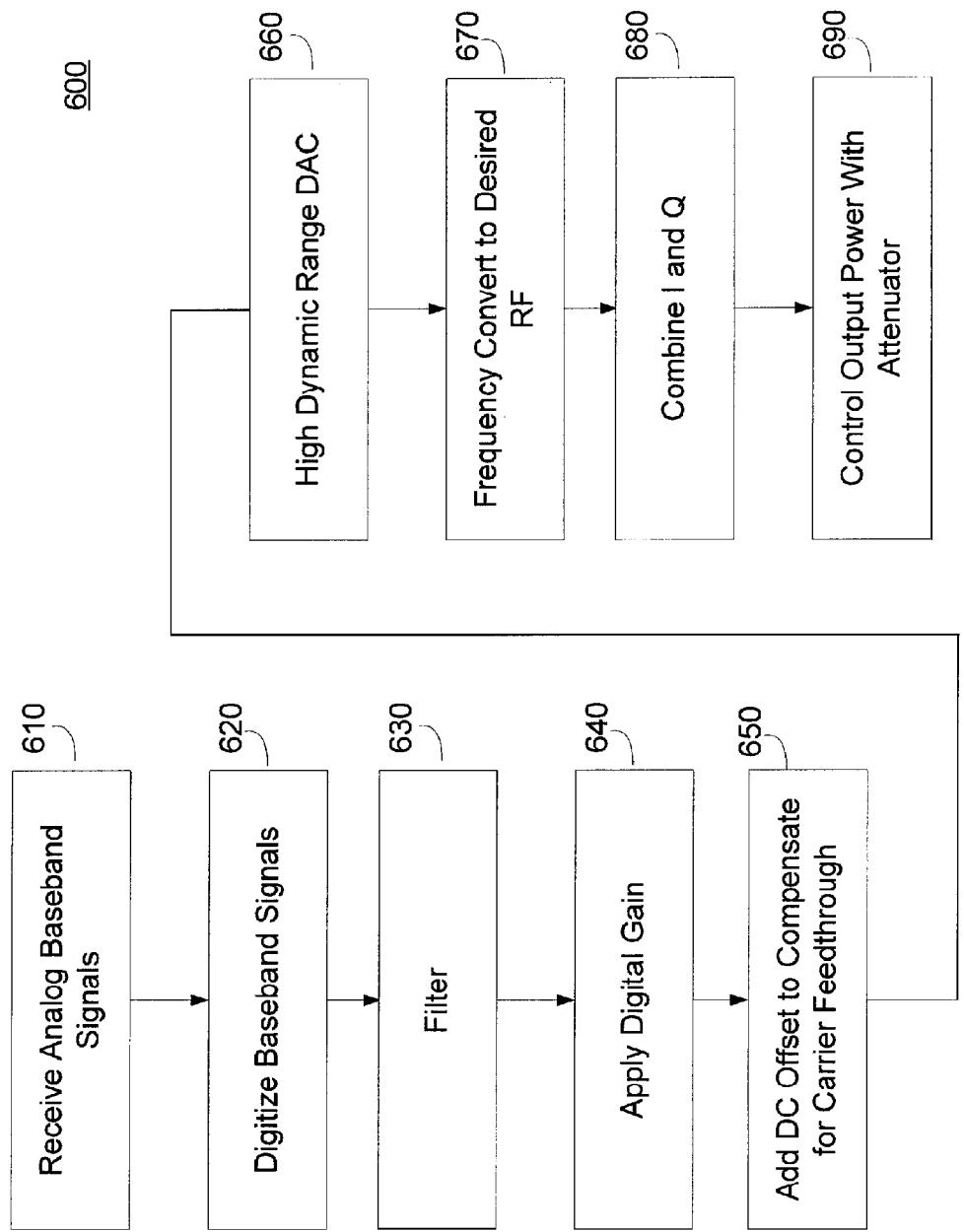
FIG. 6 is a simplified flowchart of an embodiment of a method of transmitting a high dynamic range signal with low carrier feedthrough.

FIG. 6 is a simplified flowchart of an embodiment of a method 600 of transmitting a high dynamic range signal with low carrier feedthrough. The method 600 can be performed, for example, by the multimode apparatus of FIG. 2 or FIG. 3.

The method 600 begins at block 610 where the multimode apparatus, which has previously been configured for a particular communication mode, receives baseband signals. The baseband signals can be, for example, analog in-phase (I) and quadrature (Q) baseband signal components.

The multimode apparatus proceeds to block 670 and digitizes the baseband signals to generate digital representations. The multimode apparatus proceeds to block 630 and filters the baseband signals using digital filters. The filters can be distinct I and Q signal path filters, and can be used to attenuate undesired signal components outside a desired bandwidth.

The multimode apparatus proceeds to block 640 and amplifies the I and Q baseband signals. The multimode apparatus can amplify the gain digitally, and the amount of gain can be determined based in part on a gain control loop.

The multimode apparatus proceeds to block 650 and adds a DC offset to each of the I and Q signal components in order to compensate for carrier feedthrough at the transmitter output. Because a DC baseband signal frequency translates to the carrier frequency, carrier feedthrough can be canceled or otherwise compensated by summing a DC signal with the baseband signal. A DC signal can be summed to each of the I and Q signal components, and the amount of DC offset added to the signal components can be the same or different.

The multimode apparatus proceeds to block 660 and converts the digital baseband I and Q signal components to analog representations. Because a variable gain is applied to the baseband signals, the DAC needs to have the ability to span the complete amplitude dynamic range of the baseband signals. In one embodiment, a high dynamic range current folding DAC is used to convert the baseband signals.

After converting the baseband I and Q signal components to an analog representation, the multimode apparatus proceeds to block 670 and upconverts the I and Q signals to I and Q RF signals at the desired frequency. The multimode apparatus can perform upconversion using a direct conversion stage implemented using a mixer for each of the I and Q signal paths.

After upconverting the signals, the multimode apparatus proceeds to block 680 and combines the RF I and Q signals to form a composite RF signal. In one embodiment, the multimode apparatus sums the RF I and Q signals.

The multimode apparatus process to block 670 and controls the output power of the transmitter by controlling an attenuator. The final output power of the transmitter can be controlled by controlling the digital gains at the baseband frequencies and by controlling the attenuation at the RF frequency. Controlling the attenuation can be preferable to controlling the gain of an RF amplifier, because the attenuator may not add significant noise to the output signal.

The multimode apparatus can thus implement a low noise for a full duplex communication mode by implementing digital gain in the baseband stages and implementing an attenuator in the RF stage. The use of gain at the baseband stages and attenuation at the RF stage allows a transmitter to be implemented without the need for RF bandpass filters external to the multimode apparatus.

The carrier feedthrough can be minimized or substantially removed by configuring a second receiver to operate as a portion of a carrier feedthrough cancellation loop. The second receiver determines a DC signal that is representative of the carrier feedthrough, and a carrier compensation module can determine a DC offset to add to the baseband transmit signals to compensate for cancel the carrier feedthrough.

Apparatus and methods have been disclosed for a low noise transmitter in a multimode communication device. The low noise transmitter utilizes direct upconversion. Gain can be limited to the baseband stages and power control performed on the RF signal can be limited to attenuation. The carrier feedthrough of the direct conversion transmitter is reduced or substantially canceled using a receiver in the multimode apparatus that can operate to support a second communication mode. During the period of time that the multimode apparatus is configured to support a first full duplex communication mode, the second receiver is configured to operate as part of a carrier feedthrough cancellation loop. The second receiver can be configured to downconvert the transmit RF signal from the desired transmitter to a baseband signal, such that the carrier is frequency converted to a DC signal. A carrier compensation module operates on the DC signal to determine a compensation value used to cancel the carrier feedthrough.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A multimode apparatus configurable to support a plurality of communication standards, the apparatus comprising:
   a first transceiver selectively configurable to support a first communication mode of the plurality of communication modes, the first transceiver including a first transmitter and a first receiver;
   a second transceiver selectively configurable to support a second communication mode of the plurality of communication modes, the second transceiver including a second transmitter and a second receiver, and wherein the second receiver is configured to be a portion of a carrier feedthrough cancellation loop of the first transmitter when the multimode apparatus is configured to support the first communication mode;
   an RF switch configured to couple an output of the first transmitter to an input of the second receiver when the multimode apparatus is configured to support the first communication mode; and
   a carrier compensation module having an input coupled to an output of the second receiver when the multimode apparatus is configured to support the first communication mode, an output coupled to a baseband portion of the first transmitter, and configured to generate a carrier feedthrough cancellation signal based at least in part on a signal output by the second receiver,
   wherein the carrier compensation module is configured to generate a DC offset value based on a DC value of the signal output by the second receiver, and sum the DC offset value with a baseband signal of the first transmitter.

* * * * *